(12) United States Patent
Nakamura et al.

(10) Patent No.: US 10,877,163 B2
(45) Date of Patent: Dec. 29, 2020

(54) METHOD AND DEVICE FOR CALCULATING ATTITUDE ANGLE

(71) Applicant: Furuno Electric Co., Ltd., Nishinomiya (JP)

(72) Inventors: Hiraku Nakamura, Nishinomiya (JP); Naomi Fujisawa, Nishinomiya (JP); Hiroyuki Toda, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 221 days.

(21) Appl. No.: 15/779,478

(22) PCT Filed: Oct. 25, 2016

(86) PCT No.: PCT/JP2016/081568
§ 371 (c)(1),
(2) Date: May 25, 2018

(87) PCT Pub. No.: WO2017/090359
PCT Pub. Date: Jun. 1, 2017

(65) Prior Publication Data
US 2018/0259653 A1    Sep. 13, 2018

(30) Foreign Application Priority Data
Nov. 27, 2015 (JP) .................. 2015-231194

(51) Int. Cl.
*G01S 19/54* (2010.01)
*B64G 1/24* (2006.01)
(Continued)

(52) U.S. Cl.
CPC .............. *G01S 19/54* (2013.01); *B64G 1/244* (2019.05); *G01C 19/00* (2013.01); *G01S 19/47* (2013.01);
(Continued)

(58) Field of Classification Search
CPC .......... G01S 19/47; G01S 19/53; G01S 19/54; B64G 1/244; B64G 2001/245; G01C 19/00
See application file for complete search history.

(56) References Cited

U.S. PATENT DOCUMENTS

| 6,088,653 A | 7/2000 | Sheikh et al. |
| 6,408,245 B1 | 6/2002 | An et al. |

FOREIGN PATENT DOCUMENTS

| JP | 2008298443 A | 12/2008 |
| JP | 2012208033 A | 10/2012 |

OTHER PUBLICATIONS

ISA Japan Patent Office, International Search Report Issued in Application No. PCT/JP2016/081568, dated Jan. 17, 2017, WIPO, 4 pages.

*Primary Examiner* — Dao L Phan
(74) *Attorney, Agent, or Firm* — Alleman Hall Creasman & Tuttle LLP (57) ABSTRACT

The purpose is to easily achieve verification of an integrated attitude angle based on an inertial sensor. An attitude angle calculating device may include an integrated attitude angle calculating module, a reverse-calculated value calculating module, a reference value calculating module, and a determining module. The integrated attitude angle calculating module may calculate an integrated attitude angle using an output of the inertial sensor and a positioning signal. The reverse-calculated value calculating module may reverse calculate, using the integrated attitude angle, a physical quantity obtained based on the positioning signal that is used for calculating the integrated attitude angle. The reference value calculating module may calculate a reference physical quantity corresponding to the reverse-calculated physical quantity, based on an observation value of the positioning signal. The determining module may determine whether to (Continued)

reset the calculation of the integrated attitude angle by using the reverse-calculated physical quantity and the reference physical quantity.

14 Claims, 5 Drawing Sheets

(51) Int. Cl.
  *G01S 19/47*   (2010.01)
  *G01S 19/53*   (2010.01)
  *G01C 19/00*   (2013.01)
(52) U.S. Cl.
  CPC ........ *G01S 19/53* (2013.01); *B64G 2001/245*
                (2013.01)

METHOD AND DEVICE FOR CALCULATING ATTITUDE ANGLE

CROSS REFERENCE TO RELATED APPLICATIONS

This application is a U.S. National stage of International Application No. PCT/JP2016/081568 filed on Oct. 25, 2016. This application claims priority to Japanese Patent Application No. 2015-231194 filed on Nov. 27, 2015. The entire disclosure of Japanese Patent Application No. 2015-231194 is hereby incorporated herein by reference.

TECHNICAL FIELD

The present disclosure relates to a method and device for calculating an attitude angle, in which the attitude angle is calculated by using an output of an inertial sensor and a positioning signal.

BACKGROUND ART

Various devices for calculating an attitude angle of a movable body, such as a ship, are conventionally devised. For example, Patent Document 1 discloses a navigation calculation system which calculates an attitude angle by using output data of an IMU (inertial sensor) and GPS positioning data.

The navigation calculation system described in Patent Document 1 corrects, by using the GPS positioning data, an error included in the attitude angle which is based on the output of the IMU, and outputs it as an integrated attitude angle. The navigation calculation system described in Patent Document 1 compares the integrated attitude angle to a GPS attitude angle calculated based on a carrier wave observation value of the GPS and, when they are substantially in agreement with each other, determines that the carrier wave observation value of the GPS is normal.

REFERENCE DOCUMENT OF CONVENTIONAL ART

Patent Document

Patent Document 1 JP2012-208033A

DESCRIPTION OF THE DISCLOSURE

Problems to be Solved by the Disclosure

However, since IMUs, especially a low-cost IMU, cause a large bias error and also the attitude angle is calculated by multiplying output values of the IMU, the integrated attitude angle has a characteristic of having a larger error over time if the correction is not performed appropriately.

Particularly when determining an integer bias of the GPS positioning data by using the integrated attitude angle, the integer bias may deviate from a true value due to the error of the integrated attitude angle. Therefore, the integrated attitude angle obtained by correcting the output of the IMU with the GPS positioning data using the integer bias deviating from the true value, further causes an error. Moreover, the vicious spiral of this error occurs, which may cause a larger error in the integrated attitude angle.

For this reason, it is necessary to verify the integrated attitude angle and perform appropriate reset processing. For the verification of the integrated attitude angle, similar to Patent Document 1 described above, a verification method is considered, which compares the integrated attitude angle to the GPS attitude angle and, if they are substantially in agreement with each other, determines that the integrated attitude angle is correct.

However, in this method, the integrated attitude angle cannot be verified in a state where the GPS attitude angle cannot be calculated. Generally, in order to calculate the GPS attitude angle in three directions, GPS signals from at least five GPS satellites need to be received continuously in terms of time. Therefore, the verification of the integrated attitude angle is not possible unless being a situation where such an observation condition can be maintained.

Therefore, the purpose of the present disclosure is to provide a method and device for calculating an attitude angle, in which a verification of an integrated attitude angle based on an output of an inertial sensor is easily achievable.

SUMMARY OF THE DISCLOSURE

An attitude angle calculating device of the present disclosure may include an integrated attitude angle calculating module, a reverse-calculated value calculating module, a reference value calculating module, and a determining module. The integrated attitude angle calculating module may calculate an integrated attitude angle using an output of an inertial sensor and a positioning signal. The reverse-calculated value calculating module may reverse calculate, by using the integrated attitude angle, a physical quantity that is used for calculating the integrated attitude angle. The reference value calculating module may calculate a reference physical quantity corresponding to the reverse-calculated physical quantity, based on an observation value of the positioning signal. The determining module may determine whether to reset the calculation of the integrated attitude angle by using the reverse-calculated physical quantity and the reference physical quantity.

With this configuration, even if the attitude angle using the positioning signal is not calculated, physical quantities of the same type (e.g., geometric distance differences) may be calculated as the value reverse-calculated based on the integrated attitude angle, and the value calculated based on the observation value of the positioning signal. Thus, they may be compared to each other and a verification of the integrated attitude angle and the reset may be possible.

MODE FOR CARRYING OUT THE DISCLOSURE

Figure 1:
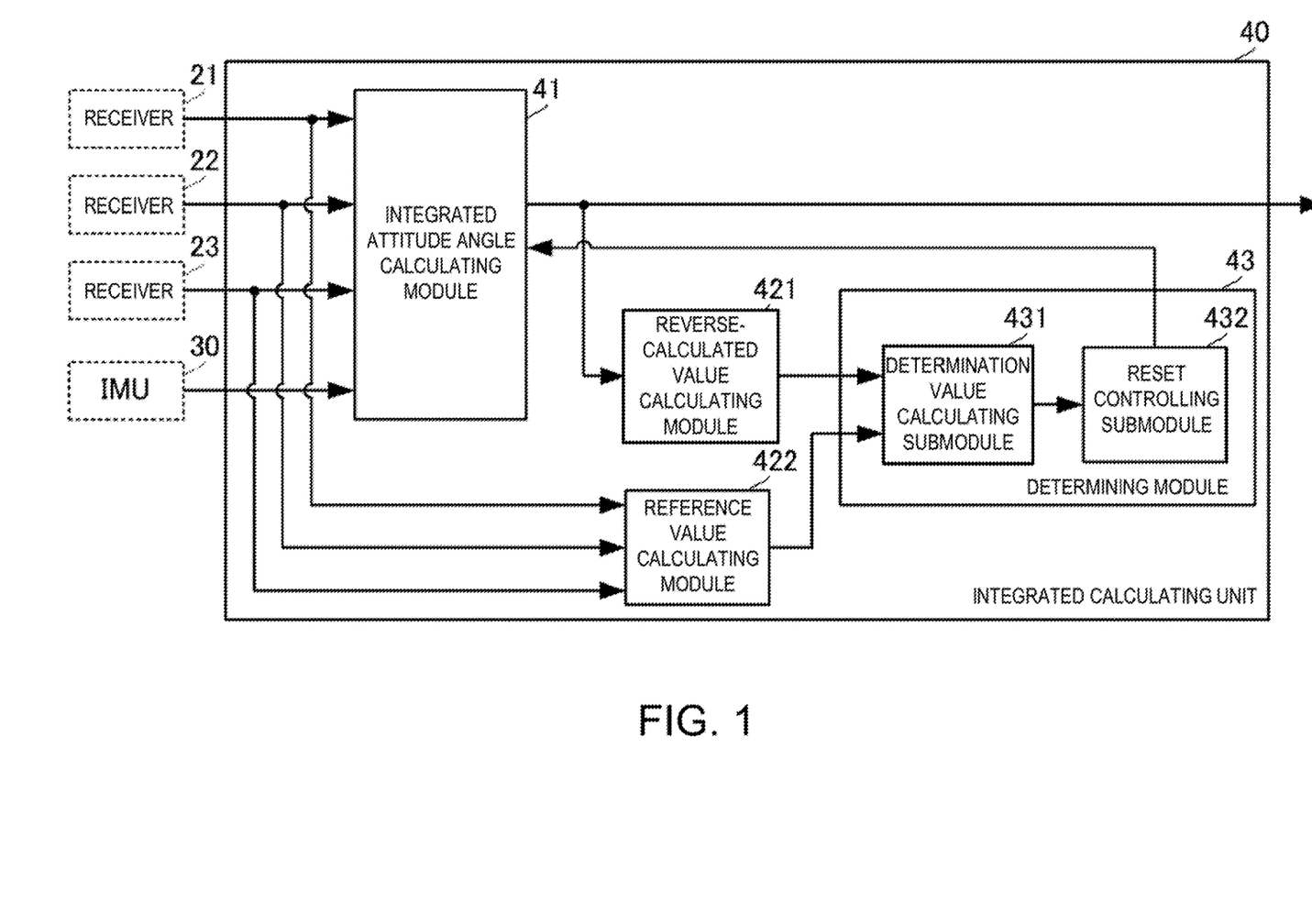
FIG. 1 is a functional block diagram of an integrated calculating unit of an attitude angle calculating device according to one embodiment of the present disclosure.
Figure 2:
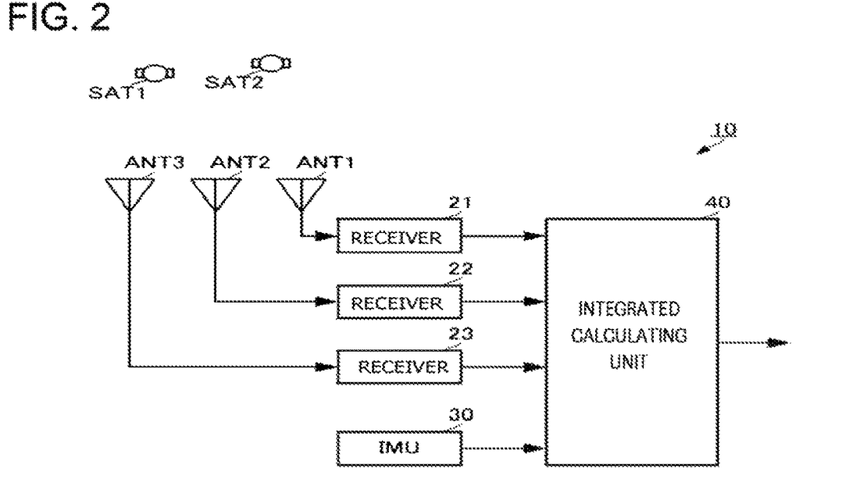
FIG. 2 is a functional block diagram of the attitude angle calculating device according to the embodiment of the present disclosure.

A method and device for calculating an attitude angle according to one embodiment of the present disclosure is described with reference to the drawings. FIG. 1 is a functional block diagram of an integrated calculating unit of an attitude angle calculating device according to the embodiment of the present disclosure. FIG. 2 is a functional block diagram of the attitude angle calculating device according to the embodiment of the present disclosure. Note that, although in this embodiment a ship is described as an example of a movable body, it may be another on-water movable body, an on-land movable body, an aerial movable body, etc.

As illustrated in FIG. 2, the attitude angle calculating device 10 may include antennas ANT1, ANT2 and ANT3, receivers 21, 22 and 23, an IMU (inertial sensor) 30, and an integrated calculating unit 40. The antenna ANT1 may be connected to the receiver 21. The antenna ANT2 may be connected to the receiver 22. The antenna ANT3 may be connected to the receiver 23. The receivers 21, 22 and 23 and the IMU 30 may be connected to the integrated calculating unit 40.

The antennas ANT1, ANT2 and ANT3 may be arranged in a pattern in which these three antennas are not disposed in line. In other words, the antenna ANT3 may not be disposed on a straight line connecting the antenna ANT1 and the antenna ANT2. Note that, although the number of antennas of this embodiment may be three, it may alternatively be four or, if the specifications are for calculating at least one component of the attitude angle, it may be two. The arrangement space interval of the antennas ANT1, ANT2 and ANT3 may preferably be shorter than a wavelength of a positioning signal. By using such an arrangement space interval, an integer bias of an inter-antenna single phase difference (which may also be referred to as single difference) may easily be determined.

The antennas ANT1, ANT2 and ANT3 may receive positioning signals of positioning satellites SAT1 and SAT2 and output them to the receivers 21, 22 and 23. The positioning satellites may include GNSS (Global Navigation Satellite System) satellites, such as GPS (Global Positioning System) satellites. Note that although in this embodiment, the number of positioning satellites from which the positioning signals are received may be two, it may alternatively be different from this. A reset determination described later is possible as long as positioning signals from at least one positioning satellite are successfully received.

Note that, in order to calculate an attitude angle in three directions (roll angle, pitch angle, heading angle) based on the positioning signals, positioning signals from at least five positioning satellites may be needed to be received. Also in this case, the reset determination is possible for every positioning signal.

The receiver 21 may track the positioning signal received by the antenna ANT1 and calculate a pseudorange and a carrier phase integrated value. The receiver 21 may output the pseudorange and the carrier phase integrated value to the integrated calculating unit 40. The receiver 22 may track the positioning signal received by the antenna ANT2 and calculate a pseudorange and a carrier phase integrated value. The receiver 22 may output the pseudorange and the carrier phase integrated value to the integrated calculating unit 40. The receiver 23 may track the positioning signal received by the antenna ANT3 and calculate a pseudorange and a carrier phase integrated value. The receiver 23 may output the pseudorange and the carrier phase integrated value to the integrated calculating unit 40.

The IMU 30 may be an inertial sensor including at least an angular velocity sensor and may further include another sensor, such as an acceleration sensor. The IMU 30 may output an output value of the sensor to the integrated calculating unit 40.

The integrated calculating unit 40 may calculate an integrated attitude angle with a known attitude angle calculating method of the Tightly Coupled type, by using the output value of the IMU 30 and the pseudoranges and the carrier phase integrated values from the receivers 21, 22 and 23. To describe briefly, the integrated calculating unit 40 may calculate the integrated attitude angle by using the output value of the IMU 30. Here, the integrated calculating unit 40 may estimate an error (bias error etc.) of the IMU 30 by using the pseudoranges and the carrier phase integrated values. The integrated calculating unit 40 may use the estimated error as a correction term for calculating the next integrated attitude angle.

With such a configuration, the integrated calculating unit 40 may further verify the integrated attitude angle and, when it determines that the error of the integrated attitude angle is large, may reset the calculation of the integrated attitude angle.

As illustrated in FIG. 1, the integrated calculating unit 40 may include an integrated attitude angle calculating module 41, a reverse-calculated value calculating module 421, a reference value calculating module 422, and a determining module 43. The determining module 43 may include a determination value calculating submodule 431 and a reset controlling submodule 432.

The integrated attitude angle calculating module 41 may be connected to the receivers 21, 22 and 23 and the IMU 30. The integrated attitude angle calculating module 41 may be connected to the reverse-calculated value calculating module 421. The reverse-calculated value calculating module 421 may be connected to the determination value calculating submodule 431. The reference value calculating module 422 may be connected to the receivers 21, 22 and 23 and the determination value calculating submodule 431. The determination value calculating submodule 431 may be connected to the reset controlling submodule 432. The reset controlling submodule 432 may be connected to the integrated attitude angle calculating module 41.

The integrated attitude angle calculating module 41 may perform calculation processing of the integrated attitude angle described above, by using the output value of the IMU 30 and the pseudoranges and the carrier phase integrated values from the receivers 21, 22 and 23. The integrated attitude angle calculating module 41 may output the integrated attitude angle to an outside thereof as well as to the reverse-calculated value calculating module 421.

The reverse-calculated value calculating module 421 may reverse calculate, from the integrated attitude angle, a physical quantity to be used for calculating the attitude angle based on the positioning signals. The reverse-calculated value calculating module 421 may output the reverse-calculated physical quantity to the determination value calculating submodule 431.

For example, the reverse-calculated value calculating module 421 may reverse calculate a baseline vector between two antennas (e.g., the antenna ANT1 and the antenna ANT2) among the antennas ANT1, ANT2 and ANT3 from the integrated attitude angle. The reverse-calculated value calculating module 421 may acquire the positions of the positioning satellites SAT1 and SAT2 from navigation messages included in the positioning signals. The reverse-calculated value calculating module 421 may calculate the positions of the antennas ANT1 and ANT2 based on measurement values obtained by tracking the positioning signals. The reverse-calculated value calculating module 421 may calculate a difference between a geometric distance from the positioning satellite SAT1 to the antenna ANT1 and a geometric distance from the positioning satellite SAT1 to the antenna ANT2, that is, a geometric distance difference between the antenna ANT1 and the antenna ANT2 with respect to the positioning satellite SAT1, by using the positions of the antennas ANT1 and ANT2, the baseline vector and the position of the positioning satellite SAT1. This calculation processing may be performed with the positioning satellite SAT2. The reverse-calculated value calculating module 421 may output this geometric distance difference as a reverse-calculated value (reverse-calculated physical quantity), to the determination value calculating submodule 431.

The reference value calculating module 422 may calculate a physical quantity corresponding to the reverse-calculated value obtained by the reverse-calculated value calculating module 421 (reference physical quantity) by using the positioning signals. The reference value calculating module 422 may output the reference physical quantity to the determination value calculating submodule 431.

For example, the reference value calculating module 422 may calculate the geometric distance difference by using a known method based on the carrier phase integrated values of two antennas (e.g., the antenna ANT1 and the antenna ANT2) among the antennas ANT1, ANT2 and ANT3. As one specific example, the reference value calculating module 422 may calculate the geometric distance difference between the antenna ANT1 and the antenna ANT2 with respect to the positioning satellite SAT1 based on the carrier phase integrated values of the positioning signals from the positioning satellite SAT1 received by the antenna ANT1 and the antenna ANT2. Note that, when the positioning satellite SAT2 is used in the reverse calculation described above, this processing may be performed on the positioning satellite SAT2. Here, the determination value calculating submodule 431 may need to determine an integer bias. If the distance between the antennas is less than one wavelength (more preferably, ½ wavelength) of a carrier wave of the positioning signal as described above, the integer bias may easily be determined. Therefore, in the case of such an arrangement of antennas, the geometric distance difference may easily be calculated.

The determination value calculating submodule 431 may calculate a determination value for performing the reset determination based on the reverse-calculated value and the reference physical quantity. The determination value calculating submodule 431 may output the determination value to the reset controlling submodule 432.

For example, the determination value calculating submodule 431 may calculate, as the determination value, a difference between the geometric distance difference (reverse-calculated value) based on the integrated attitude angle and the geometric distance difference (reference physical quantity) based on the carrier phase integrated values, and output it to the reset controlling submodule 432.

The reset controlling submodule 432 may be set with a threshold for the reset determination. The threshold for the reset determination may be determined based on a largest error of the attitude angle calculating device 10. The reset controlling submodule 432 may compare the determination value to the threshold and, if the comparison result indicates that the error included in the integrated attitude angle exceeds the largest error, determine that a reset condition is satisfied. The reset controlling submodule 432 may execute a reset control on the integrated attitude angle calculating module 41 upon satisfaction of the reset condition.

For example, if the difference (determination value) in the geometric distance difference is larger than the threshold for the reset determination, the reset controlling submodule 432 may determine that the reset condition is satisfied and execute the reset control on the integrated attitude angle calculating module 41. On the other hand, if the difference (determination value) in the geometric distance difference is equal to or smaller than the threshold for the reset determination, the reset controlling submodule 432 may determine that the reset condition is not satisfied and not execute the reset control on the integrated attitude angle calculating module 41.

Upon being subjected to this reset control, the integrated attitude angle calculating module 41 may reinitialize the calculation of the integrated attitude angle. In a period during which the integrated attitude angle calculating module 41 is not subjected to the reset control, it may continue the calculation of the integrated attitude angle while correcting the error caused by the IMU 30 described above.

As described above, the attitude angle calculating device 10 comprised of the configuration of this embodiment may be able to verify the integrated attitude angle which is based on the output of the IMU 30, as long as the positioning signals are received from at least one positioning satellite. Thus, even in a situation where the attitude angle cannot be calculated using the positioning signals, the integrated attitude angle may be verified. Therefore, the verification of the integrated attitude angle may be achieved more easily.

Further, the calculation of the integrated attitude angle may be reset when the error is large. Thus, the output of the attitude angle having the large error may be prevented and the attitude angle of high precision may be outputted more stably.

Note that, in the above embodiment, the mode in which the geometric distance difference corresponding to the inter-antenna single phase difference may be used for the reverse-calculated value and the reference physical quantity is described. However, in a case where positioning signals are received from a plurality of positioning satellites, a difference between geometric distance differences corresponding to a double phase difference (which may also be referred to as double difference) may be used for the reverse-calculated value and the reference physical quantity.

Further, in the above embodiment, the mode in which the reset condition may be determined to be satisfied when the comparison result between the determination value and the threshold indicates that the error included in the integrated attitude angle exceeds the largest error is described. However, the reset control may alternatively be executed when this determination is performed a plurality of times and the number of times that the reset condition is determined to be satisfied exceeds an allowable number of times. Note that, the number of times may alternatively be of the determination performed on a single positioning satellite or on a plurality of positioning satellites.

Further, as described in the above embodiment, using the geometric distance difference for the reset determination may eliminate the necessity of unit conversion between the positioning systems is required. That is, regardless of which one of the plurality of positioning systems the positioning signals belong, the reset determination may be made easier by using the processing described above. In particular, it may be more effective when using a plurality of positioning systems having different frequencies of the positioning signals.

Figure 3:
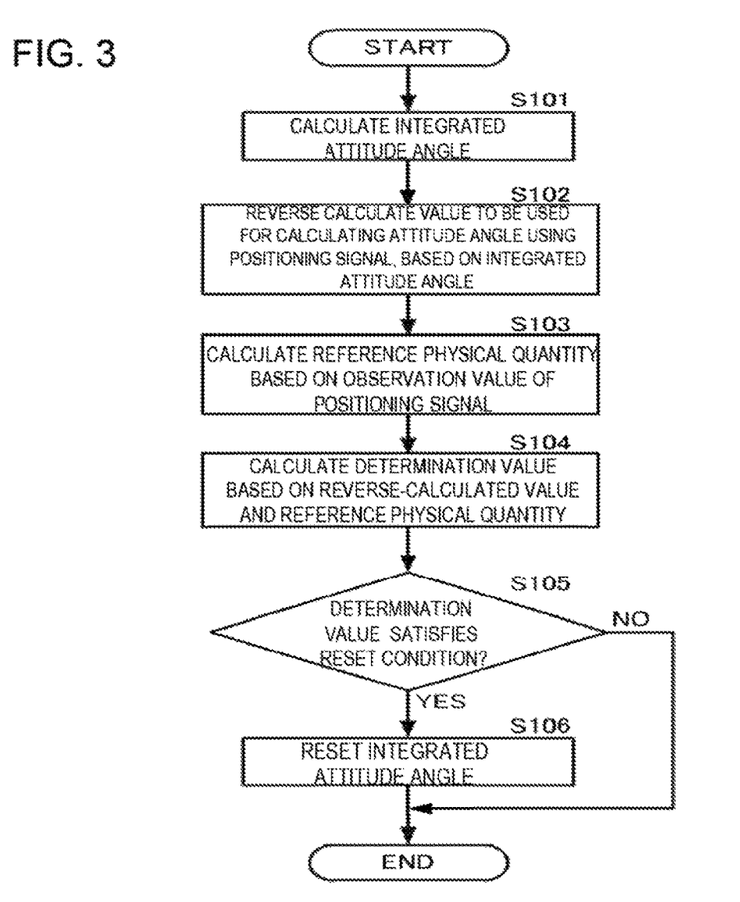
FIG. 3 is a flowchart of an attitude angle calculating method according to the embodiment of the present disclosure.
Figure 4:
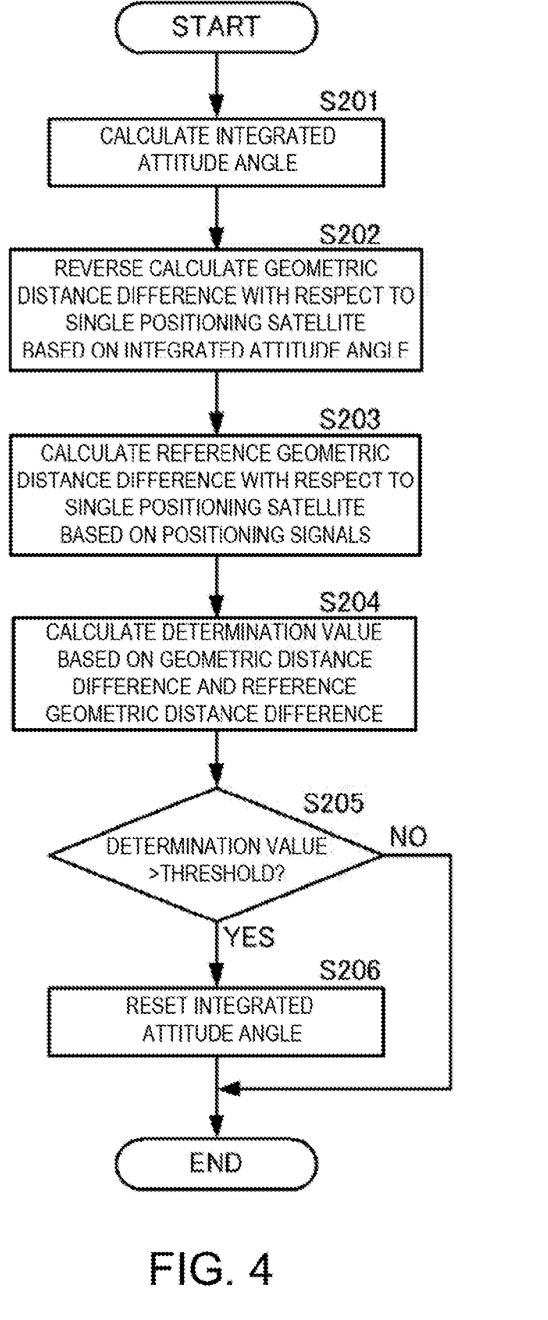
FIG. 4 is a flowchart illustrating a first specific example of the attitude angle calculating method according to the embodiment of the present disclosure.
Figure 5:
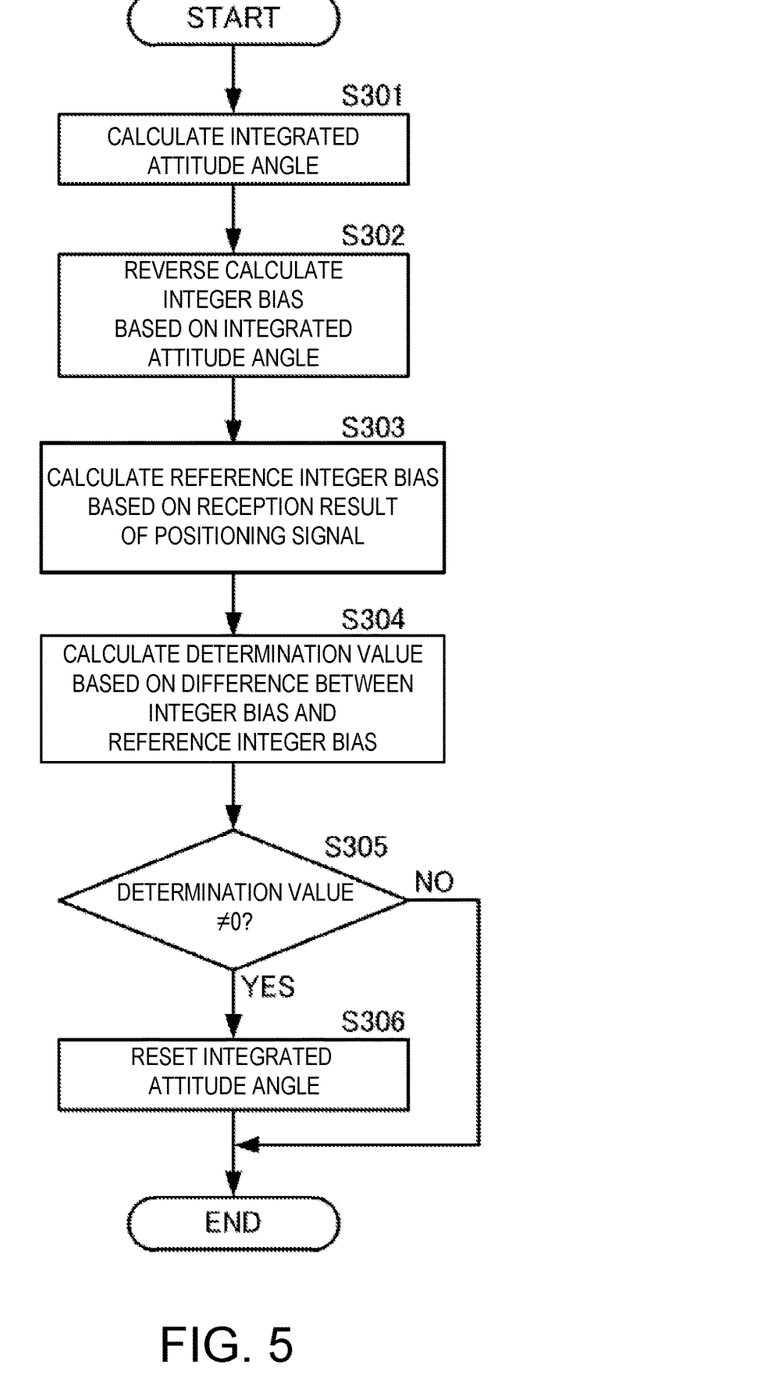
FIG. 5 is a flowchart illustrating a second specific example of the attitude angle calculating method according to the embodiment of the present disclosure.
Figure 6:
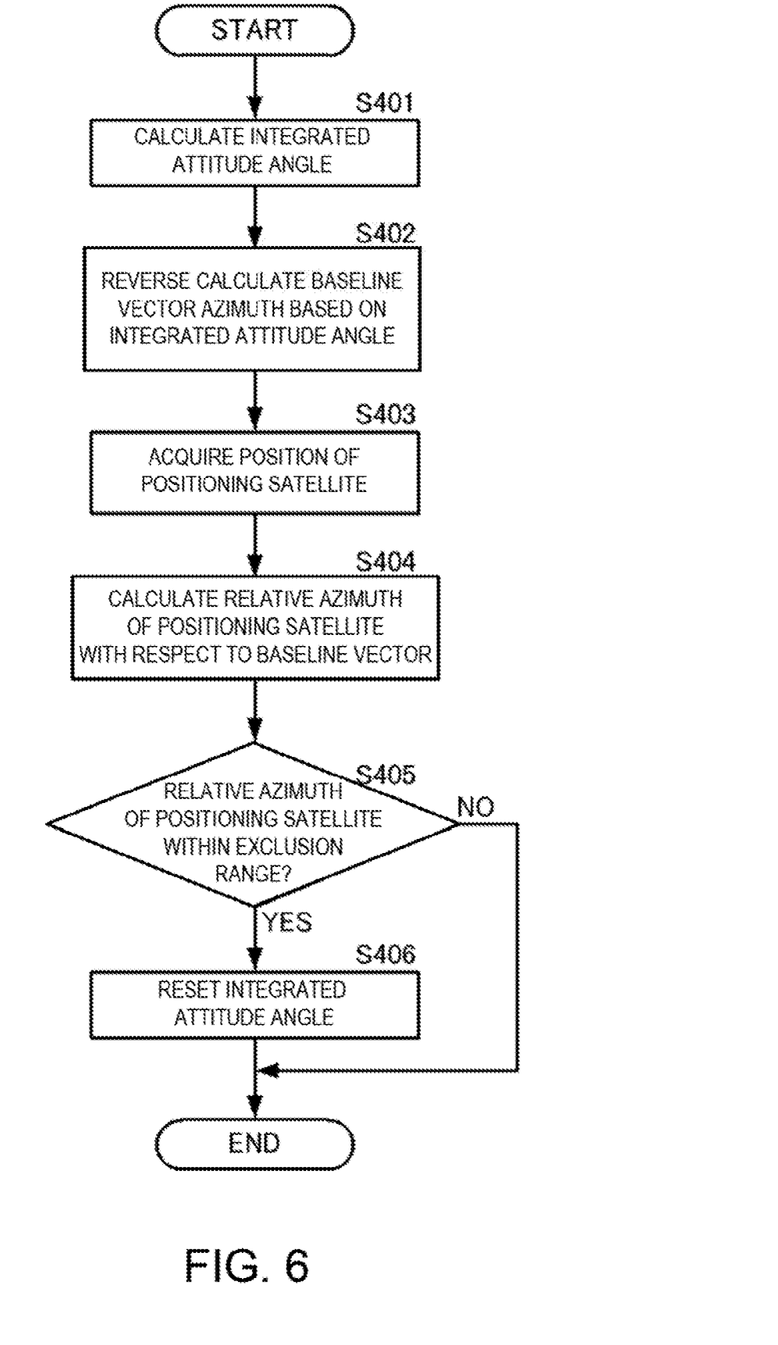
FIG. 6 is a flowchart illustrating a third specific example of the attitude angle calculating method according to the embodiment of the present disclosure.

In the above description, the mode in which the calculation, verification, and reset processing of the integrated attitude angle may be achieved by the individual functional parts is described. However, the integrated calculating unit 40 illustrated in FIG. 2 may be comprised of an information processing device, such as a computer, and the calculation, verification, and reset processing of the integrated attitude angle may be programmed and stored so that the information processing device reads them and executes them. In this case, the flow illustrated in FIG. 3 may be executed. FIG. 3 is a flowchart of the attitude angle calculating method according to the embodiment of the present disclosure. Note that, FIG. 3 is a flowchart illustrating schematic processing of the attitude angle calculating method according to this embodiment, and more specific examples of the flow of FIG. 3 are illustrated in FIGS. 4, 5 and 6.

As illustrated in FIG. 3, the integrated calculating unit 40 may calculate the integrated attitude angle by using the output of the IMU 30 and the pseudoranges and the carrier phase integrated values from the receivers 21, 22 and 23 (S101). The integrated calculating unit 40 may reverse calculate, from the calculated integrated attitude angle, the physical quantity to be used for calculating the attitude angle using the positioning signals (S102). The integrated calculating unit 40 may calculate the reference physical quantity corresponding to the physical quantity which is reverse-calculated from the integrated attitude angle, based on the observation values of the positioning signals (S103).

The integrated calculating unit 40 may calculate the determination value to be used for the reset determination of the integrated attitude angle based on the reverse-calculated physical quantity (reverse-calculated value) and the reference physical quantity (S104).

The integrated calculating unit 40 may determine whether the determination value satisfies the reset condition. If the determination value satisfies the reset condition (S105: YES), the integrated calculating unit 40 may reinitialize (reset) the calculation of the integrated attitude angle (S106). If the determination value does not satisfy the reset condition (S105: NO), the integrated calculating unit 40 may continue the calculation of the integrated attitude angle.

Thus, by using the attitude angle calculating method of this embodiment, even in the situation where the attitude angle cannot be calculated using the positioning signals, the integrated attitude angle may be verified.

Next, specific modes of the integrated attitude angle verifying method will be described.

(1) A Case of Using Geometric Distance Difference

FIG. 4 is a flowchart illustrating a first specific example of the attitude angle calculating method according to the embodiment of the present disclosure.

The integrated calculating unit 40 may calculate the integrated attitude angle by using the output of the IMU 30 and the pseudoranges and the carrier phase integrated values from the receivers 21, 22 and 23 (S201). The integrated calculating unit 40 may reverse calculate the geometric distance difference between two antennas with respect to a single positioning satellite (S202). This geometric distance difference may correspond to the reverse-calculated value (the physical quantity reverse-calculated from the integrated attitude angle). The integrated calculating unit 40 may calculate the geometric distance difference based on the difference between the carrier phase integrated values from the positioning signals at the two antennas (S203). This geometric distance difference may be a reference geometric distance difference and correspond to the reference physical quantity.

The integrated calculating unit 40 may calculate the determination value based on the geometric distance difference reverse-calculated from the integrated attitude angle and the geometric distance difference (reference geometric distance difference) calculated from the positioning signals (S204). Specifically, the integrated calculating unit 40 may calculate a difference value between the geometric distance difference reverse-calculated from the integrated attitude angle and the geometric distance difference calculated from the positioning signals, as the determination value.

The integrated calculating unit 40 may compare the determination value to the threshold for the reset determination and, if the determination value is higher than the threshold (S205: YES), reinitialize (reset) the calculation of the integrated attitude angle (S206). If the determination value is equal to or lower than the threshold (S205: NO), the integrated calculating unit 40 may continue the calculation of the integrated attitude angle.

(2) A Case of Using Integer Bias

FIG. 5 is a flowchart illustrating a second specific example of the attitude angle calculating method according to the embodiment of the present disclosure.

The integrated calculating unit 40 may calculate the integrated attitude angle by using the output of the IMU 30 and the pseudoranges and the carrier phase integrated values from the receivers 21, 22 and 23 (S301). The integrated calculating unit 40 may reverse calculate the integer bias of the single phase difference between two antennas (inter-antenna single phase difference) with respect to a single positioning satellite, from an estimated value of a decimal part of the carrier phase (decimal part estimated value) including a signal propagation delay difference between the two antennas (receivers) with respect to a single positioning satellite and also the integrated attitude angle (S302). This integer bias may correspond to the reverse-calculated value (the physical quantity reverse-calculated from the integrated attitude angle).

Note that, the decimal part estimated value may be a so-called analog delay difference, which is a difference in propagation delay of the positioning signal for each pair of the antenna and the receiver. The decimal part estimated value may be acquired by each of the following methods. An analog delay (propagation delay) between the antenna and the receiver and an analog delay (propagation delay) in the receiver may be measured for each pair of the antenna and the receiver, and the decimal part estimated value may be calculated based on the difference between these delays. Alternatively, the delay difference may be estimated as a state function by, for example, a Kalman filter, and this estimated value may be used for the decimal part estimated value. Further, the decimal part estimated value may be reverse-calculated from the baseline vector, the single phase difference, and the integer bias which are reverse-calculated from the integrated attitude angle.

The integrated calculating unit 40 may calculate the integer bias from the difference between the carrier phase integrated values based on the positioning signals at the two antennas (S303). Here, if the distance between the antennas is less than the wavelength of the positioning signal as described above, the integer bias may easily be determined. This integer bias may be a reference integer bias and correspond to the reference physical quantity.

The integrated calculating unit 40 may calculate the determination value based on the integer bias reverse-calculated from the integrated attitude angle and the decimal part estimated value, and the integer bias calculated based on the positioning signals and the decimal part estimated value (reference integer bias) (S304). Specifically, the integrated calculating unit 40 may calculate a difference value between the integer bias reverse-calculated from the integrated attitude angle and the integer bias calculated based on the positioning signals, as the determination value.

The integrated calculating unit 40 may compare the determination value to the reference value for the reset determination. Here, "reference value=0" may be satisfied. Since the integer bias is an integer, if the integrated attitude angle is accurately calculated, the integer bias reverse-calculated from the integrated attitude angle may be in agreement with the integer bias (reference integer bias) calculated based on the positioning signals. On the other hand, if the accuracy of the integrated attitude angle degrades, the integer bias reverse-calculated from the integrated attitude angle and the decimal part estimated value may not be in agreement with the integer bias calculated based on the positioning signals and the decimal part estimated value (reference integer bias). Therefore, when using the integer bias, the disagreement between the integral bias reverse-calculated from the integrated attitude angle and the decimal part estimated value, and the integer bias calculated based on the positioning signals and the decimal part estimated value may correspond to satisfying the reset condition. That is, "reference value≠0" may correspond to satisfying the reset condition.

If the determination value disagrees with the reference value (S305: YES), the integrated calculating unit 40 may reinitialize (reset) the calculation of the integrated attitude angle (S306). If the determination value is in agreement with the reference value (S305: NO), the integrated calculating unit 40 may continue the calculation of the integrated attitude angle.

As described above, the verification of the integrated attitude angle and the reset processing may be achieved also by using the integer bias. Further, when using the integer bias, since the determination is performed based on whether the values are in agreement, the verification of the integrated attitude angle may be simplified.

Note that, although the single phase difference is used in the processing of FIG. 5, a double phase difference may be used. Since the double phase difference does not include the analog delay difference, when using the double phase difference, the decimal part estimated value may not be used. Thus, the processing of obtaining the decimal part estimated value may be omitted.

(3) A Case of Using Azimuth of Positioning Satellite

FIG. 6 is a flowchart illustrating a third specific example of the attitude angle calculating method according to the embodiment of the present disclosure.

The integrated calculating unit 40 may calculate the integrated attitude angle by using the output of the IMU 30 and the pseudoranges and the carrier phase integrated value from the receivers 21, 22 and 23 (S401). The integrated calculating unit 40 may reverse calculate an azimuth (absolute azimuth) of a baseline vector between two antennas based on the integrated attitude angle (S402). The azimuth of the baseline vector may be calculated using the reverse calculation processing of the baseline vector described above and the positions of the two antennas calculated based on the pseudoranges. The azimuth of this baseline vector may correspond to the reverse-calculated value (the physical quantity reverse-calculated from the integrated attitude angle).

The integrated calculating unit 40 may acquire the position of the positioning satellite from the navigation message (S403). The integrated calculating unit 40 may calculate the azimuth (relative azimuth) of the positioning satellite with respect to the baseline vector, based on the position of the positioning satellite (corresponding to the reference physical quantity used for calculating the attitude angle using the positioning signals), the azimuth of the baseline vector, and the positions of the two antennas (S404). Note that the azimuth may include an elevation angle. The azimuth of the positioning satellite with respect to this baseline vector may correspond to the determination value.

If the azimuth (relative azimuth) of the positioning satellite is within an exclusion range (S405: YES), the integrated calculating unit 40 may reinitialize (reset) the calculation of the integrated attitude angle (S406). The exclusion range may be an azimuth range in which the calculation precision of the integer bias degrades and an accurate integer bias cannot be calculated. For example, it may be a range where a positioning satellite is located at a position in the sky on a straight line on which the two antennas are arranged or at a position in the vicinity thereof. Further, it may be a range in which an angle formed by a direction cosine vector connecting the antenna and the positioning satellite, and the baseline vector connecting the two antennas (an angle projected on a plane where the antennas are arranged) is small.

If the azimuth (relative azimuth) of the positioning satellite is outside the exclusion range (S405: NO), the integrated calculating unit 40 may continue the calculation of the integrated attitude angle.

As described above, the verification of the integrated attitude angle and the reset processing may be achieved also by using the azimuth of the positioning satellite.

Note that, without limiting to the three kinds of specific examples described above, the method and device for calculating the attitude angle in this embodiment may use any physical quantity which is calculable or acquirable using the positioning signals and also reverse-calculable from the integrated attitude angle.

Further, although the configuration of resetting the calculation processing of the integrated attitude angle is included in the above description, the configuration up to verifying the integrated attitude angle may be considered as one configuration.

DESCRIPTION OF REFERENCE CHARACTERS

10: Attitude Angle Calculating Device
21, 22, 23: Receiver
30: IMU
40: Integrated Calculating Unit
41: Integrated Attitude Angle Calculating Module
421: Reverse-calculated Value Calculating Module
422: Reference Value Calculating Module
43: Determining Module
431: Determination Value Calculating Submodule
432: Reset Controlling Submodule
ANT1, ANT2, ANT3: Antenna
SAT1, SAT2: Positioning Satellite

What is claimed is:
1. A method of calculating an attitude angle, comprising:
calculating an integrated attitude angle using an output of an inertial sensor and a positioning signal;
reverse calculating, by using the integrated attitude angle, a physical quantity obtained based on the positioning signal that is used for calculating the integrated attitude angle, wherein the physical quantity is a variable that is calculated between two antennas;

calculating a reference physical quantity corresponding to the reverse-calculated physical quantity, based on an observation value of the positioning signal; and determining a reset of calculation processing of the integrated attitude angle by using the reverse-calculated physical quantity and the reference physical quantity.

2. The method of calculating an attitude angle of claim 1, comprising executing a reset control on the calculation processing of the integrated attitude angle, when a reset condition is determined as satisfied in the determination.

3. An attitude angle calculating device, comprising:
processing circuitry configured to:
calculate an integrated attitude angle using an output of an inertial sensor and a positioning signal,
reverse calculate a physical quantity obtained from the positioning signal used for calculating the integrated attitude angle, using the integrated attitude angle, wherein the physical quantity is a variable that is calculated between two antennas,
calculate a reference physical quantity corresponding to the reverse-calculated physical quantity, based on an observation value of the positioning signal, and
determine whether to reset the calculation of the integrated attitude angle by using the reverse-calculated physical quantity and the reference physical quantity.

4. The attitude angle calculating device of claim 3, wherein
the processing circuitry is further configured to:
reverse calculate a geometric distance difference corresponding to a single difference between two antennas with respect to a single positioning satellite, from the integrated attitude angle,
calculate a geometric distance difference corresponding to the single difference based on a carrier phase of the positioning signal, as the reference physical quantity, and
determine whether to reset by using the reverse-calculated geometric distance difference and the geometric distance difference calculated as the reference physical quantity.

5. The attitude angle calculating device of claim 3, wherein
the processing circuitry is further configured to:
reverse calculate a difference between geometric distance differences corresponding to a double difference between two antennas with respect to two positioning satellites, from the integrated attitude angle,
calculate a difference between the geometric distance differences corresponding to the double difference based on a carrier phase of the positioning signal, as the reference physical quantity, and
determine whether to reset by using the reverse-calculated difference between the geometric distance differences and the difference between the geometric distance differences calculated as the reference physical quantity.

6. The attitude angle calculating device of claim 3, wherein
the processing circuitry is further configured to:
reverse calculate an integer bias from the integrated attitude angle,
calculate an integer bias based on a carrier phase of the positioning signal, as the reference physical quantity, and
determine whether to reset the calculation of the integrated attitude angle by using a difference between the integer bias calculated as the reference physical quantity and the integer bias reverse-calculated from the integrated attitude angle.

7. The attitude angle calculating device of claim 6, wherein the integer bias is an integer bias of a single difference between two antennas with respect to a single positioning satellite.

8. The attitude angle calculating device of claim 6, wherein the integer bias is an integer bias of a double difference between two antennas with respect to two positioning satellites.

9. The attitude angle calculating device of claim 3, wherein
the processing circuitry is further configured to:
reverse calculate an azimuth of a baseline vector connecting two antennas, from the integrated attitude angle,
calculate an azimuth of a positioning satellite based on the positioning signal, and
determine whether to reset the calculation of the integrated attitude angle by using a relative azimuth of the positioning satellite to the baseline vector obtained based on the reverse-calculated azimuth of the baseline vector and the azimuth of the positioning satellite.

10. The attitude angle calculating device of claim 3, wherein the processing circuitry is further configured to execute a reset control on the calculation of the integrated attitude angle when a reset condition is satisfied.

11. The attitude angle calculating device of claim 3, wherein the processing circuitry is further configured to calculate the integrated attitude angle by a Tightly Coupled method.

12. The attitude angle calculating device of claim 3, comprising a plurality of antennas configured to receive the positioning signal,
wherein a space interval of the plurality of antennas is shorter than a wavelength of the positioning signal.

13. The method of calculating an attitude angle of claim 1, wherein the physical quantity includes at least one of a geometric distance difference, integer bias, and an azimuth of a baseline vector.

14. The attitude angle calculating device of claim 3, wherein the physical quantity includes at least one of a geometric distance difference, integer bias, and an azimuth of a baseline vector.

* * * * *